(12) United States Patent
Hama et al.

(10) Patent No.: US 11,732,444 B2
(45) Date of Patent: Aug. 22, 2023

(54) DISPLAY SYSTEM FOR WORK MACHINE

(71) Applicant: KOBELCO CONSTRUCTION MACHINERY CO., LTD., Hiroshima (JP)

(72) Inventors: Ryota Hama, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 217 days.

(21) Appl. No.: 17/424,775

(22) PCT Filed: Nov. 19, 2019

(86) PCT No.: PCT/JP2019/045321
§ 371 (c)(1),
(2) Date: Jul. 21, 2021

(87) PCT Pub. No.: WO2020/170526
PCT Pub. Date: Aug. 27, 2020

(65) Prior Publication Data
US 2022/0064908 A1    Mar. 3, 2022

(30) Foreign Application Priority Data

Feb. 20, 2019   (JP) ................................. 2019-028325

(51) Int. Cl.
*E02F 9/26*    (2006.01)
*B25J 13/06*   (2006.01)
(Continued)

(52) U.S. Cl.
CPC ................. *E02F 9/26* (2013.01); *B25J 13/06* (2013.01); *B60R 1/00* (2013.01); *G06T 17/00* (2013.01);
(Continued)

(58) Field of Classification Search
CPC ... E02F 9/26; E02F 9/205; B25J 13/06; B60R 1/00; B60R 2300/307; G06T 17/00; H04N 7/18
See application file for complete search history.

(56) References Cited

U.S. PATENT DOCUMENTS 6,285,931 B1 * 9/2001 Hattori .................. G07C 5/008
701/29.1
6,778,097 B1   8/2004 Kajita et al.
(Continued)

FOREIGN PATENT DOCUMENTS

JP    H11-132071 A    5/1999
JP    2015-043488 A   3/2015
(Continued)

*Primary Examiner* — Terrell M Robinson
(74) *Attorney, Agent, or Firm* — Carrier, Shende & Associates P.C.; Joseph P. Carrier; Fulchand P. Shende

(57) ABSTRACT

An image of a work attachment (operation mechanism) of a work machine and the periphery of the work attachment, which corresponds to captured image data acquired by an imaging device, is displayed on an image output device by means of a first communication mode established between a slave control device mounted in the work machine and a master control device. When the first communication mode is interrupted, instead of the image of the operation mechanism of the work machine and the periphery of the operation mechanism, a point cloud image corresponding to distance image data acquired by a distance sensor is displayed on the image output device by means of a second communication mode established between the slave control device and the master control device.

5 Claims, 8 Drawing Sheets

(51) Int. Cl.
  *B60R 1/00* (2022.01)
  *G06T 17/00* (2006.01)
  *H04N 7/18* (2006.01)
  *G01S 17/894* (2020.01)
  *E02F 9/20* (2006.01)

(52) U.S. Cl.
  CPC .......... *H04N 7/18* (2013.01); *B60R 2300/307* (2013.01); *E02F 9/205* (2013.01); *G01S 17/894* (2020.01)

(56)     References Cited

U.S. PATENT DOCUMENTS

| | | | |
|---|---|---|---|
| 7,181,370 B2 * | 2/2007 | Furem | E02F 9/205 |
| | | | 701/50 |
| 8,996,224 B1 * | 3/2015 | Herbach | G05D 1/0027 |
| | | | 701/25 |
| 2016/0361815 A1 | 12/2016 | Matsunami et al. | |
| 2020/0126464 A1 * | 4/2020 | Onishi | G09G 3/20 |
| 2021/0025131 A1 * | 1/2021 | Sasaki | G06V 20/56 |

FOREIGN PATENT DOCUMENTS

| | | |
|---|---|---|
| JP | 2015-174155 A | 10/2015 |
| WO | 2017/042873 A1 | 3/2017 |

\* cited by examiner

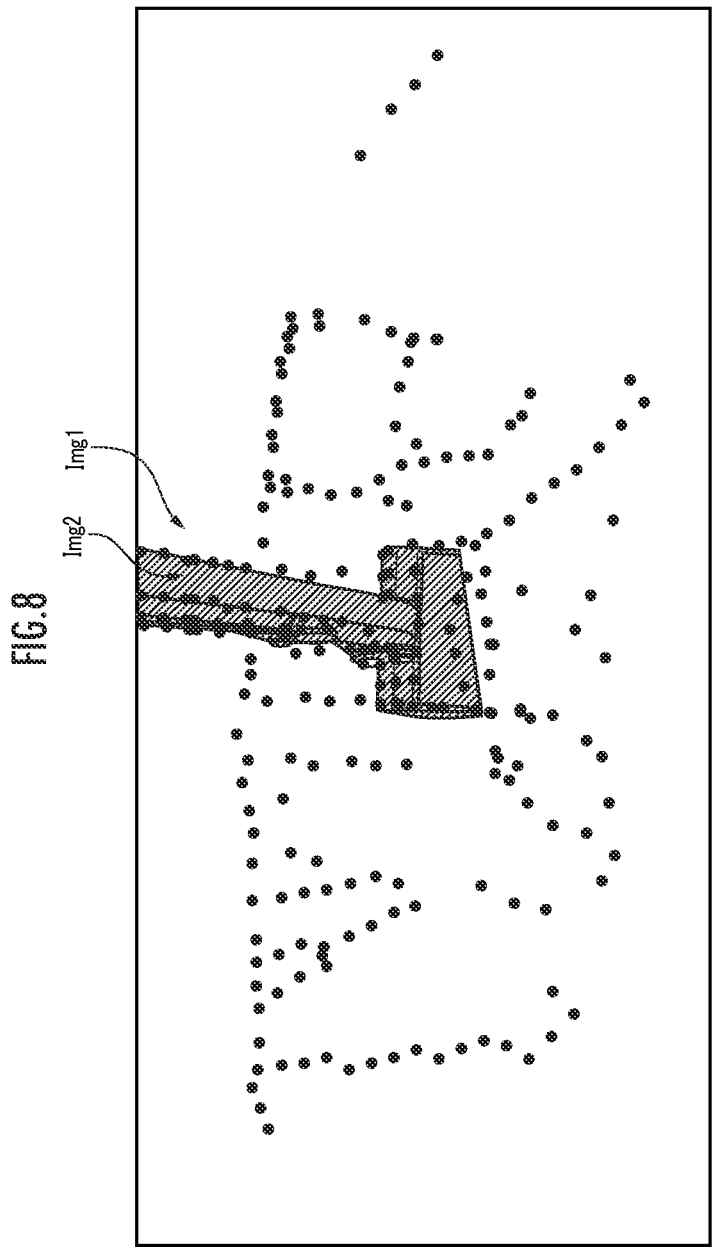

DISPLAY SYSTEM FOR WORK MACHINE

TECHNICAL FIELD

The present invention relates to a system that displays the state of the periphery of a work machine to enable an operator to visually recognize the state.

BACKGROUND ART

A technique has been proposed in which a robot controlled by remote operation is used to shorten the operation time (for example, refer to Patent Literature 1). The robot predicts a next second command based on the content of a first command issued from a remote operation terminal. The robot determines whether or not to transmit the result of operation of an operation unit corresponding to the second command (predicted command) to the remote operation terminal, based on the result of comparison result between a third command and the second command issued from the remote operation terminal after the first command is issued. In such a manner, the operation of the robot to be executed after a next remote command is transmitted can be performed during standby period for the remote command, so that the time of entire work is shortened.

CITATION LIST

Patent Literature

Patent Literature 1: Japanese Patent Application Laid-Open No. 2015-174155

SUMMARY OF INVENTION

Technical Problem

However, in a situation where while monitoring the state of the periphery of a work machine such a robot, an operator remotely operates the robot, when communication between a remote operation terminal and the robot required for the monitoring is interrupted, a remote command corresponding to an operation performed by the operator may be an inappropriate command in view of a situation around the robot.

Therefore, an object of the present invention is to provide a system that enables a user, who is remote from a work machine, to recognize a situation around the work machine even when communication between a slave control device mounted in the work machine and a master control device is interrupted.

Solution to Problem

According to an aspect of the present invention, there is provided a display system for a work machine including: an imaging device configured to acquire captured image data representing a captured image of an operation mechanism forming a work machine and a periphery of the operation mechanism; a distance sensor configured to acquire distance image data representing a distance from the work machine to each of the operation mechanism and an object, which exists around the operation mechanism, in an imaging range of the imaging device; a slave control device that is mounted in the work machine, and has a function of transmitting the captured image data according to a first communication method and a function of transmitting the distance image data according to a second communication method different from the first communication method; a master control device that has a function of receiving the captured image data according to the first communication method and a function of receiving the distance image data according to the second communication method; and an image output device configured to display an image of the operation mechanism of the work machine and the periphery of the operation mechanism, the image being represented by the captured image data that is transmitted from the slave control device and received by the master control device.

In the display system for a work machine according to the aspect of the present invention, the master control device generates a point cloud image based on the distance image data, determines whether or not communication according to the first communication method is interrupted, and causes the image output device to display the point cloud image instead of the image of the operation mechanism of the work machine and the periphery of the operation mechanism on a condition that the communication is determined to be interrupted.

BRIEF DESCRIPTION OF DRAWINGS

FIG. 8 is a view describing a display mode in which a point cloud image and a three-dimensional model image are superimposed on each other.

DESCRIPTION OF EMBODIMENTS (Configuration)

Figure 1:
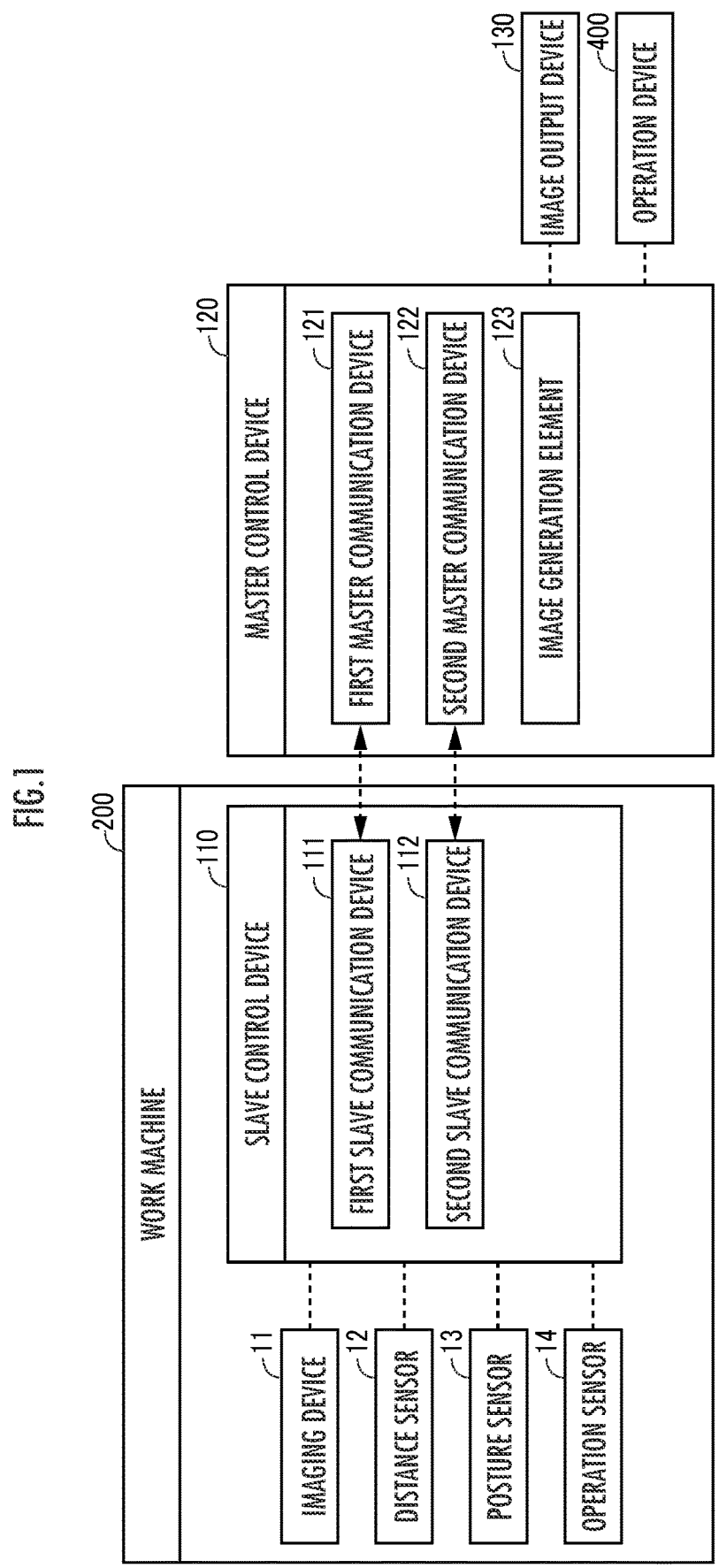
FIG. 1 is a block diagram describing a configuration of a display system for a work machine as one embodiment of the present invention.

A display system for a work machine as one embodiment of the present invention illustrated in FIG. 1 includes an imaging device 11, a distance sensor 12, a posture sensor 13, an operation sensor 14, a slave control device 110, a master control device 120, and image output device 130. The imaging device 11, the distance sensor 12, the posture sensor 13, the operation sensor 14, and the slave control device 110 are mounted in a crawler excavator as one embodiment of a work machine 200. The master control device 120 and the image output device 130 are mounted in or connected to an operation device 400.

Figure 2:
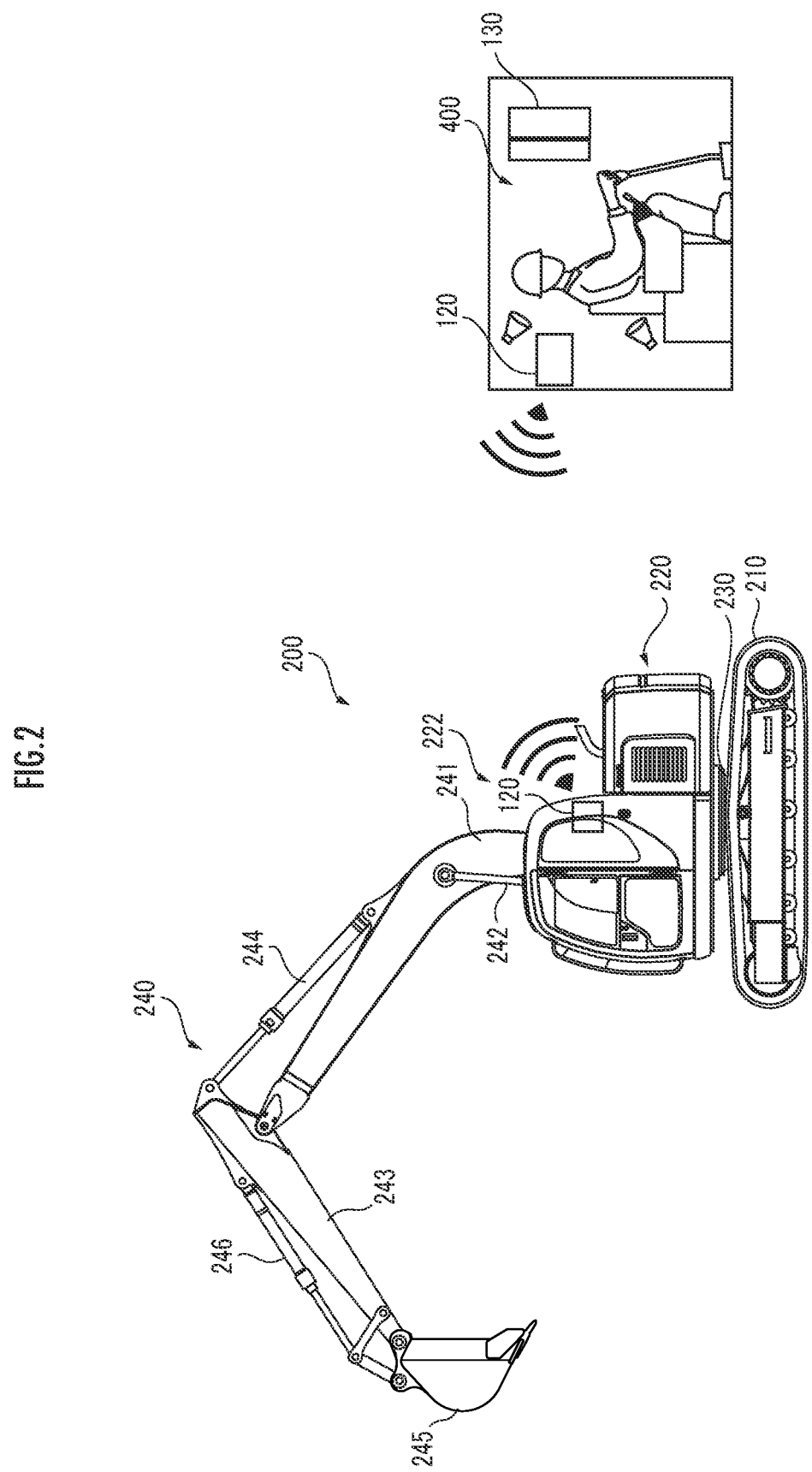
FIG. 2 is a side view of a crawler excavator as a work machine.
Figure 3:
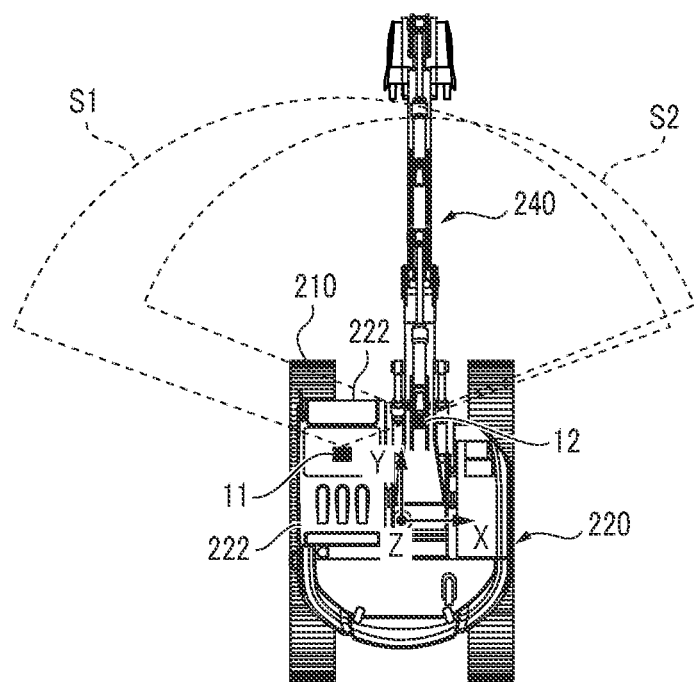
FIG. 3 is a top view of the crawler excavator as the work machine.

The work machine 200 is, for example, a crawler excavator (construction machine), and as illustrated in FIGS. 2 and 3, includes a lower traveling body 210 of a crawler type and an upper turning body 220 that is mounted on the lower traveling body 210 so as to be turnable via a turning mechanism 230. A cab (operation room) 222 is provided in a front left portion of the upper turning body 220. A work attachment 240 is provided in a front central portion of the upper turning body 220.

The work attachment 240 includes a boom 241 that is derrickably mounted on the upper turning body 220, an arm 243 that is rotatably connected to a tip of the boom 241, and a bucket 245 that is rotatably connected to a tip of the arm 243. A boom cylinder 242, an arm cylinder 244, and a bucket cylinder 246 which includes respective expandable hydraulic cylinders are mounted in the work attachment 240.

The boom cylinder 242 intervenes between the boom 241 and the upper turning body 220 such that the boom cylinder 242 receives the supply of a hydraulic oil to expand and thus rotates the boom 241 in a derricking direction. The arm cylinder 244 intervenes between the arm 243 and the boom 241 such that the arm cylinder 244 receives the supply of the hydraulic oil to expand and thus rotates the arm 243 around a horizontal axis with respect to the boom 241. The bucket cylinder 246 intervenes between the bucket 245 and the arm 243 such that the bucket cylinder 246 receives the supply of the hydraulic oil to expand and thus rotates the bucket 245 around the horizontal axis with respect to the arm 243.

The operation device 400 includes a traveling operation device, a turning operation device, a boom operation device, an arm operation device, and a bucket operation device. Each operation device includes an operation lever that receives a rotation operation. The operation lever (traveling lever) of the traveling operation device is operated to cause the lower traveling body 210 to operate. The traveling lever may also serve as a traveling pedal. For example, the traveling pedal may be provided in such a way as to be fixed to a base portion or a lower end portion of the traveling lever. The operation lever (turning lever) of the turning operation device is operated to cause a hydraulic turning motor, which forms the turning mechanism 230, to operate. The operation lever (boom lever) of the boom operation device is operated to cause the boom cylinder 242 to operate. The operation lever (arm lever) of the arm operation device is operated to cause the arm cylinder 244 to operate. The operation lever (bucket lever) of the bucket operation device is operated to cause the bucket cylinder 246 to operate. The operation device 400 includes a wireless communication device that wirelessly communicates with an actual machine side wireless communication device mounted in the work machine 200.

Figure 4:
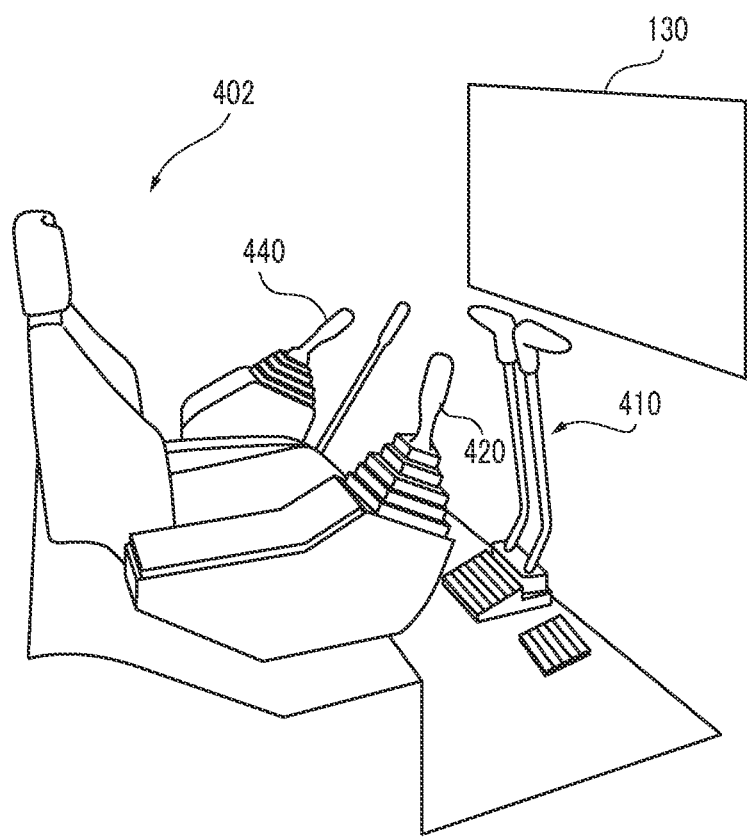
FIG. 4 is a view describing an internal space of a cab.

The operation levers forming the operation device 400 are provided around a seat 402 in which an operator sits in a remote operation room. For example, as illustrated in FIG. 4, a pair of right and left traveling levers 410 corresponding to right and left crawlers may be disposed laterally side by side in front of the seat 402. The seat 402 is in the form of a high back chair with armrests, but may be in any form such as the form of a low back chair without a headrest or the form of a chair without a backrest in which an operator can sit.

The cab 222 is provided with actual machine side operation levers corresponding to the operation levers provided in the remote operation room, and a drive mechanism or a robot that receives a signal corresponding to an operation mode of each operation lever from the remote operation room to operate the actual machine side operation levers based on the received signal. The actual machine side operation levers may be directly operated by an operator existing in the cab 222. Namely, the operation device 400 includes the actual machine side operation lever and a remote control valve that outputs a pilot pressure having a magnitude corresponding to the operation amount of the actual machine side operation lever from a port corresponding to an operation direction. In this case, the operation device 400 may be configured to be able to communicate with the work machine 200 in a wired manner instead of a wireless manner.

One operation levers may also serve as a plurality of operation levers. For example, a right operation lever 420 provided in front of a right frame of the seat 402 illustrated in FIG. 4 may function as the boom lever when being operated in a front-rear direction, and function as the bucket lever when being operated in a right-left direction. Similarly, a left operation lever 440 provided in front of a left frame of the seat 402 illustrated in FIG. 4 may function as the arm lever when being operated in the front-rear direction, and function as the turning lever when being operated in the right-left direction. The lever pattern may be randomly changed according to an operation instruction of an operator.

The imaging device 11 includes, for example, a CCD camera, and acquires captured image data representing a captured image of the work attachment 240 as an operation mechanism forming the work machine 200 and the periphery of the work attachment 240. The captured image is an image having physical quantities such as luminance and color other than distance as pixel values. As illustrated in FIG. 3, the imaging device 11 is disposed in an internal space of the cab 222 such that an imaging range S1 in front of the work machine 200 includes the work attachment 240.

The distance sensor 12 includes, for example, a TOF sensor, and acquires distance image data representing the distance from the work machine 200 to each of the operation mechanism and an object existing around the operation mechanism. The distance image data is data representing a distance image having the distance to an object as a pixel value. As illustrated in FIG. 3, the distance sensor 12 is disposed in a front central portion of the upper turning body 220 such that an imaging range S2 in front of the work machine 200 overlaps the imaging range S1.

The posture sensor 13 includes, for example, a rotary encoder, and acquires posture data representing the posture of the work attachment 240 (operation mechanism) with reference to the upper turning body 220 as a base body. For example, the angles representing the postures of the boom 241, the arm 243, and the bucket 245 with respect to the upper turning body 220 are determined based on the rotation angle of the boom 241 with respect to the upper turning body 220, the rotation angle of the arm 243 with respect to the boom 241, and the rotation angle of the bucket 245 with respect to the arm 243, respectively.

The operation sensor 14 includes, for example, a hydraulic sensor, and acquires operation data representing operation of the work machine 200, the operation being indicated by the hydraulic pressure of each of the boom cylinder 242, the arm cylinder 244, and the bucket cylinder 246.

The slave control device 110 includes a first slave communication device 111 and a second slave communication device 112. The first slave communication device 111 has a function of transmitting and receiving data according to a first communication method, and for example, has a function of transmitting the "captured image data" according to the first communication method. The second slave communication device 112 has a function of transmitting and receiving data according to a second communication method, and for example, has a function of transmitting the "distance image data", the "posture data", and the "operation data" according to the second communication method.

The first communication method is, for example, a wireless LAN (Wi-Fi) (registered trademark), and the second communication method is, for example, STD-T108 which is different from the first communication method. The first communication method is a communication method in which the communication speed and the capacity take precedence so as to transmit large-sized data such as the "captured image data". The second communication method is a communication method in which the communication stability takes precedence so as to transmit information containing small-sized data such as the "distance image data", the "posture data", and the "operation data" as information for assisting the "captured image data".

The master control device 120 includes a first master communication device 121 and a second master communication device 122. The first master communication device 121 has a function of transmitting and receiving data according to the first communication method, and for example, has a function of receiving the "captured image data" according to the first communication method. The second master communication device 122 has a function of transmitting and receiving data according to the second communication method, and for example, has a function of receiving the "distance image data", the "posture data", and the "operation data" according to the second communication method.

The slave control device 110 and the master control device 120 each include a common or individual arithmetic processing units (single-core processors, multi-core processors, or processor cores forming the same), and read out necessary data and software from a storage device such as a memory, and executes arithmetic processing on the data as a target according to the software to output the result of the arithmetic processing.

The image output device 130 is disposed on a front side with reference to a sitting portion of the seat 402 (place where an operator stays) in which an operator sits in the remote operation room (or the internal space of the cab 222) that is an operation space of the work machine 200. The image output device 130 may include an audio output device such as a speaker.

(Function)

The function of the display system for a work machine having the above configuration will be described.

(Function of Slave Control Device)

Figure 5:
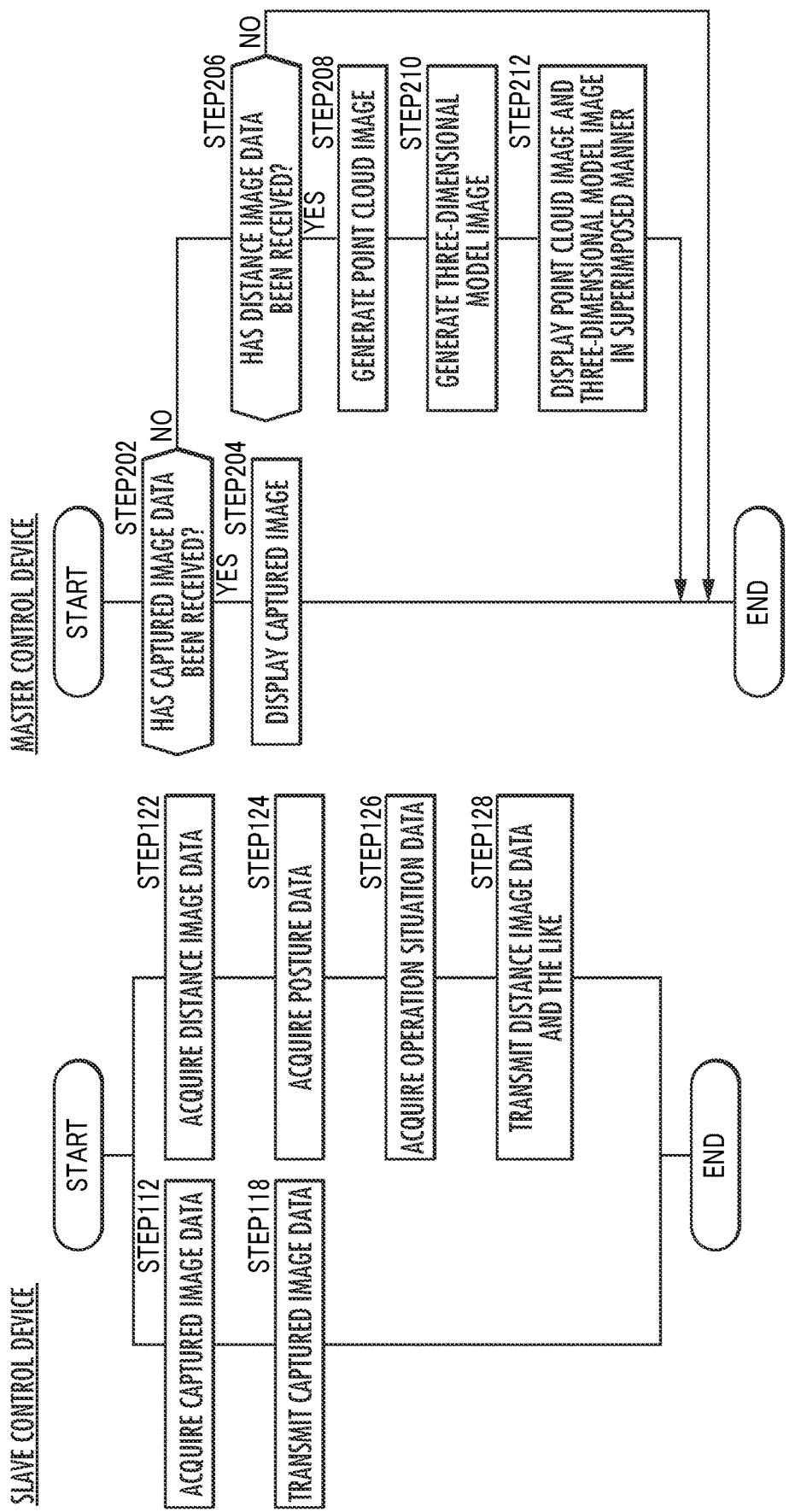
FIG. 5 is a flowchart describing the function of the display system for a work machine.

The imaging device 11 acquires captured image data representing the states of the work attachment 240 which is the operation mechanism and the periphery of the work attachment 240 (FIG. 5/STEP 112). The first slave communication device 111 transmits the captured image data to the master control device 120 (FIG. 5/STEP 118).

The distance sensor 12 acquires distance image data representing the distances to the work attachment 240 which is the operation mechanism and to an object existing around the work attachment 240 (FIG. 5/STEP 122). The posture sensor 13 acquires posture data representing the posture of the work attachment 240, which is the operation mechanism, with respect to the upper turning body 220 (FIG. 5/STEP 124). The operation sensor 14 acquires operation data representing operation of the work machine 200, the operation being indicated by the hydraulic pressure of each of the boom cylinder 242, the arm cylinder 244, and the bucket cylinder 246 (FIG. 5/STEP 126). The second slave communication device 112 transmits the distance image data, the posture data, and the operation data (hereinafter, appropriately referred to as "distance image data and the like") to the master control device 120 (FIG. 5/STEP 128).

The acquisition and transmission of the captured image data and the acquisition and transmission of the distance image data and the like may be executed in parallel by individual arithmetic processing elements (individual cores forming a multi-core processor), or may be executed in series by a single arithmetic processing element (single-core processor).

(Function of Master Control Device)

Figure 6:
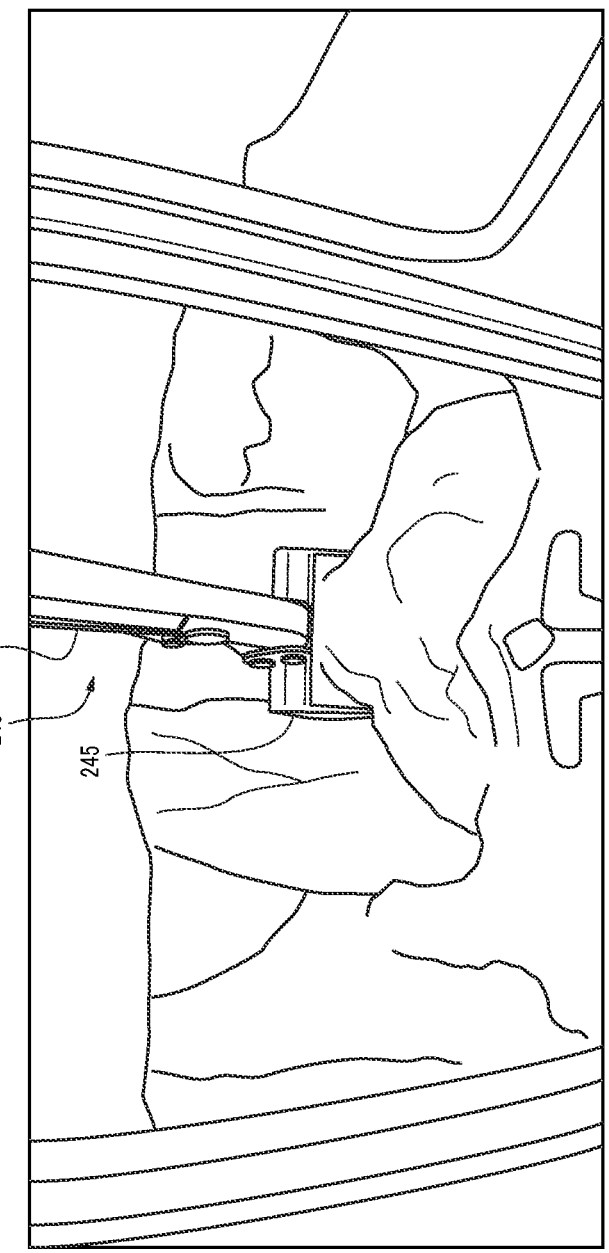
FIG. 6 is a view describing a display mode of a captured image.

It is determined where or not the first master communication device 121 has received the captured image data, namely, whether or not communication between the slave control device 110 mounted in the work machine 200 and the master control device 120 according to the first communication method (hereinafter, appropriately referred to as a "first communication mode") has been interrupted (FIG. 5/STEP 202). When the determination result is positive (FIG. 5/STEP 202—YES), the master control device 120 causes the image output device 130 to display an image corresponding to the captured image data (FIG. 5/STEP 204). Accordingly, for example, as illustrated in FIG. 6, the image output device 130 displays a captured image representing the work attachment 240 which is the operation mechanism of the work machine 200 and an earth mound existing in front of the work machine 200 as an object around the work attachment 240. In FIG. 6, a part of earth of the earth mound is scooped by the arm 243 and the bucket 245 forming the work attachment 240.

Figure 7:
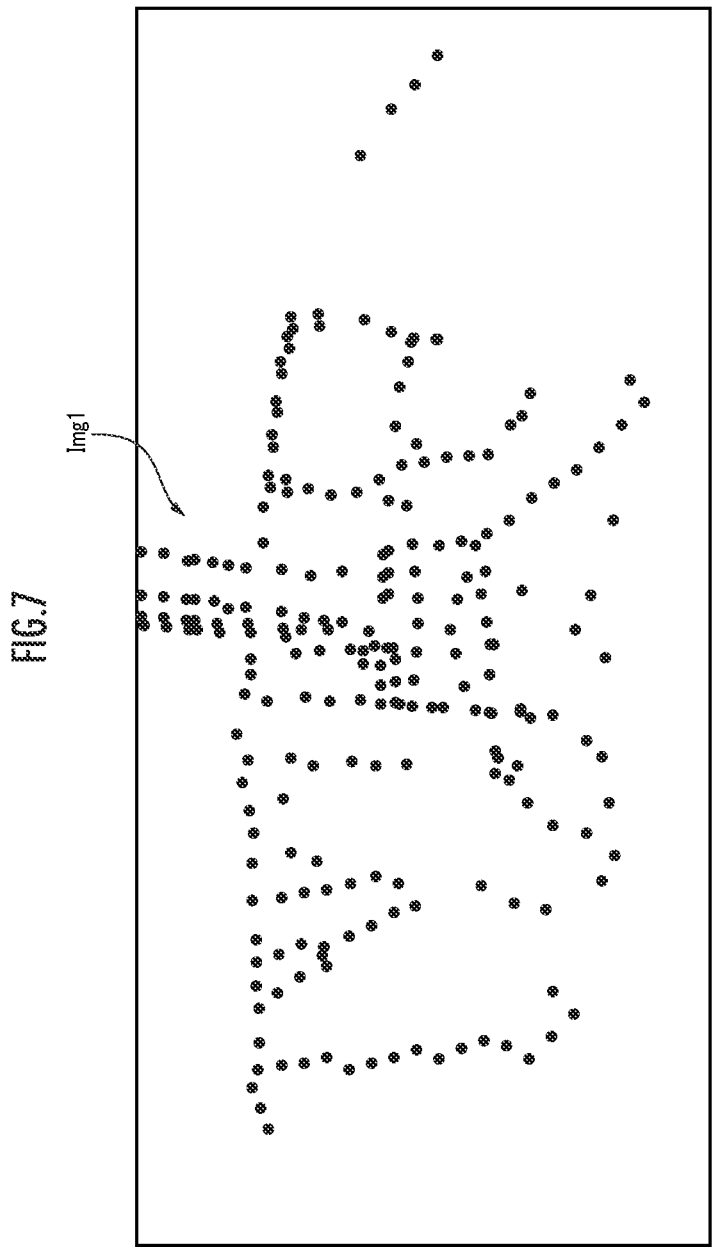
FIG. 7 is a view describing a display mode of a point cloud image.

On the other hand, when the determination result is negative (FIG. 5/STEP 202—NO), it is determined whether or not the second master communication device 122 has received the distance image data and the like, namely, whether or not communication according to the second communication method (second communication mode) has been interrupted (FIG. 5/STEP 206). When the determination result is positive (FIG. 5/STEP 206—YES), an image generation element 123 generates a point cloud image corresponding to the distance image data (FIG. 5/STEP 208). Each point forming the point cloud image represents a feature point such as an edge or a corner at which the pixel value (distance) of a pixel adjacent to the each point in a predetermined scanning direction changes to exceed a threshold value. At this time, a coordinate system of the point cloud image is coordinate transformed into a coordinate system of the captured image. A coordinate transformer (rotation matrix or quaternion equivalent to the rotation matrix and translation matrix) which causes the position and the posture (direction of an optical axis or central axis) of the distance sensor 12 to coincide with the position and the posture (direction of an optical axis) of the imaging device 11 is used for the coordinate transformation. A distance which is the pixel value of a distance image is assigned to each pixel of the captured image by using an appropriate interpolation method corresponding to a difference in resolution between the captured image and the distance image. Accordingly, for example, a point cloud image Img 1 as illustrated in FIG. 7 is generated.

Further, the image generation element 123 generates a three-dimensional model image based on the main specifications of the work attachment 240 as the operation mechanism and the posture of the work attachment 240 with respect to the upper turning body 220, the posture being represented by the posture data (FIG. 5/STEP 210).

For example, the position and the posture of a rotation axis of one end portion of the arm 243 (=rotation axis of the other end portion of the boom 241) with respect to the upper turning body 220 are estimated based on the rotation angle of one end portion of the boom 241 around a rotation axis with respect to the upper turning body 220 and the size of the boom 241 as a main specification (interval between the rotation axis of the one end portion and the rotation axis of the other end portion, or the like). The position and the posture of a rotation axis of the bucket 245 (=rotation axis of the other end portion of the arm 243) with respect to the upper turning body 220 are estimated based on the rotation angle of the one end portion of the arm 243 around the rotation axis with respect to the boom 241 and the size of the arm 243 as a main specification (interval between the rotation axis of the one end portion and the rotation axis of the other end portion, or the like). The position and the posture of each portion such as a tip portion of bucket 245 with respect to the upper turning body 220 are estimated based on the rotation angle of the bucket 245 around a rotation axis with respect to the arm 243 and the size of the bucket 245 as a main specification (interval between the rotation axis of one end portion and a rotation axis of the other end portion, or the like). The disposition mode or the extension mode of each of the work attachment 240 and the components 241, 243, and 245 of the work attachment 240 in the world coordinate system or a work machine coordinate system (coordinate system of which the position and the posture are fixed with respect to the upper turning body 220) is estimated based on the estimation results, and a three-dimensional model image of the work attachment 240 which has an extension mode corresponding to the estimation results in the coordinate system of the point cloud image is generated.

In addition, a different three-dimensional model image is generated according to the difference in operation state of the work machine 200 which is represented by the operation data. For example, a three-dimensional model image is generated such that the color (hue, saturation, or brightness) of the three-dimensional model image differs according to a difference between one operation state in which a load applied to the work attachment 240 through the bucket 245 is included in one load range and the other operation state in which the load is included in the other load range. A three-dimensional model image is generated such that the color of the three-dimensional model image differs according to a difference between one operation state in which the bucket 245 is in contact with an object (earth and stone or the like) and the other operation state in which the bucket 245 is not in contact with an object.

Then, the point cloud image and the three-dimensional model image are displayed on the image output device 130 in a superimposed manner (FIG. 5/STEP 212). Accordingly, for example, as illustrated in FIG. 8, the point cloud image Img 1 and a three-dimensional model image Img 2 are displayed in a superimposed manner.

The point cloud image Img 1 and the three-dimensional model image Img 2 displayed on the image output device in a current control cycle may be images other than the images generated in the current control cycle, which are generated in preceding control cycles and stored in the storage device forming the master control device 120. Accordingly, it is not necessary to wait for the generation of images in the current control cycle, so that the time interval from the interruption of the first communication mode to the display of the point cloud image can be shortened.

When the second communication mode is determined to be interrupted (FIG. 5/STEP 206—NO), the image output device 130 displays an image (still image) corresponding to captured image data immediately before the first communication mode is interrupted.

When the first communication mode is determined to be not interrupted (FIG. 5/STEP 202—YES) after the first communication mode has been determined to be interrupted (FIG. 5/STEP 202—NO) and accordingly, the point cloud image and the three-dimensional model image are displayed in a superimposed manner (FIG. 5/STEP 212), the image output device 130 displays an image corresponding to the captured image data again (refer to FIG. 5/STEP 204 and FIG. 6).

(Effects)

According to the display system for a work machine having the above configuration, an image of the work attachment 240 (operation mechanism) of the work machine 200 and the periphery of the work attachment 240, which corresponds to the captured image data acquired by the imaging device 11, is displayed on the image output device 130 by means of the first communication mode established between the slave control device 110 mounted in the work machine 200 and the master control device 120 (refer to FIG. 5/STEP 202—YES→STEP 204 and FIG. 6). Accordingly, a user (or an operator who operates the work machine 200 through the operation device 400) can recognize the states of the work attachment 240 and the periphery of the work attachment 240 such as a relative positional relationship between the work attachment 240 and an object existing around the work attachment 240.

When the first communication mode is interrupted, instead of the image of the operation mechanism of the work machine and the periphery of the operation mechanism, the point cloud image corresponding to the distance image data acquired by the distance sensor 12 is displayed on the image output device 130 by means of the second communication mode established between the slave control device 110 and the master control device 120 (refer to FIG. 5/STEP 202—NO→STEP 212 and FIG. 8).

Since the second communication method is different from the first communication method, even when the first communication mode is interrupted, the interruption of transmission and reception of the distance image data according to the second communication method can be avoided. When the data amount of the distance image data is smaller than the data amount of the captured image data, the interruption of communication is easily avoided due to a reduction in load of the second communication mode. In this case, the image corresponding to the captured image data and the point cloud image corresponding to the distance image data which are displayed on the image output device 130 are switched by coordinate transformation between the image coordinate systems as described above as if the imaging device 11 and the distance sensor 12 are disposed at the same position and posture in a real space (refer to FIGS. 6 and 8).

Therefore, the user can continuously recognize the states of the work attachment 240 and the periphery of the work attachment 240 by the point cloud image in which the information amount of the image displayed on the image output device 130 can be reduced but which is continuously displayed in time series on the image of the work attachment 240 as the operation mechanism of the work machine 200 and the periphery of the work attachment 240, which has been displayed on the image output device immediately before the information amount is reduced.

Further, due to the superimposed display of the three-dimensional model image and the point cloud image on the image output device, it can be easily recognized that which of feature points of the operation mechanism and feature points of an object around the operation mechanism is represented by each of points forming the point cloud image, so that a reduction in information amount is further suppressed by that amount than in the image corresponding to the captured image data (refer to FIG. 8). For this reason, when the first communication mode is interrupted, the user can more accurately recognize the states of the operation mechanism and the periphery of the operation mechanism.

Further, due to the difference in display mode (for example, a change in color or brightness (change such as blinking), a change in model shape (expansion or contraction), or any combination of the factors) of the three-dimensional model image that is displayed on the image output device 130 to be superimposed on the point cloud image, the user can recognize operation states such as an operation direction and the operation speed of the work attachment 240 as the operation mechanism and whether or not the work attachment 240 is in contact with a peripheral object. For this reason, when the first communication mode is interrupted, the user can more accurately recognize the states of the work attachment 240 and the periphery of the work attachment 240 including the difference in operation state of the work attachment 240.

Other Embodiments of Present Invention

The master control device 120 may cause the image output device 130 to display a point cloud image and a texture material in a superimposed manner based on the condition that the first communication mode is determined to be interrupted. Regarding the texture material, the type of each of image regions of a captured image may be estimated based on captured image data, and a texture material corresponding to the estimated type (for example, earth, stone, plant, metal, or the like) may be read out from the storage device to be displayed in the image region on the point cloud image in a superimposed manner. For example, in the point cloud image illustrated in FIG. 8, a texture material representing earth may be displayed in a superimposed manner in a region estimated to correspond to an earth mound.

According to the display system for a work machine having the above configuration, due to the superimposed display of a texture material and a point cloud image on the image output device 130, it can be easily recognized that which of the feature points of the work attachment 240 and feature points of an object around the work attachment 240 is represented by each of points forming the point cloud image, so that a reduction in information amount is further suppressed by that amount than in the image corresponding to the captured image data. For this reason, when the first communication mode is interrupted, the user can more accurately recognize the states of the operation mechanism and the periphery of the operation mechanism.

In the embodiment, the posture sensor 13 may be omitted, and the generation and the displaying of the three-dimensional model image on the point cloud image in a superimposed manner may be omitted. In this case, for example, as illustrated in FIG. 7, the point cloud image which does not include the three-dimensional model image is displayed on the image output device 130.

In the embodiment, the operation sensor 14 may be omitted, and the differentiation of the display mode of the three-dimensional model image according to the difference in operation state of the work machine 200 may be omitted.

DESCRIPTION OF REFERENCE NUMERALS

11: imaging device
12: distance sensor
13: posture sensor
14: operation sensor
110: slave control device
111: first slave communication device
112: second slave communication device
120: master control device
121: first master communication device
122: second master communication device
123: image generation element
130: image output device
200: work machine
240: operation mechanism (work attachment)
400: operation device
402: seat (place where operator stays)

The invention claimed is:

1. A display system for a work machine comprising:
an imaging device configured to acquire captured image data representing a captured image of an operation mechanism forming a work machine and a periphery of the operation mechanism;
a distance sensor configured to acquire distance image data representing a distance from the work machine to each of the operation mechanism and an object, which exists around the operation mechanism, in an imaging range of the imaging device;
a slave control device that is mounted in the work machine, and has a function of transmitting the captured image data according to a first communication method and a function of transmitting the distance image data according to a second communication method different from the first communication method;
a master control device that has a function of receiving the captured image data according to the first communication method and a function of receiving the distance image data according to the second communication method; and
an image output device configured to display an image of the operation mechanism of the work machine and the periphery of the operation mechanism, the image being represented by the captured image data that is transmitted from the slave control device and received by the master control device,
wherein the master control device generates a point cloud image based on the distance image data, determines whether or not communication according to the first communication method is interrupted, and causes the image output device to display the point cloud image instead of the image of the operation mechanism of the work machine and the periphery of the operation mechanism on a condition that the communication is determined to be interrupted.

2. The display system for a work machine according to claim 1,
wherein the work machine includes a posture sensor configured to acquire posture data representing a posture of the operation mechanism with reference to a base body,
the slave control device has a function of transmitting the posture data according to the second communication method,
the master control device has a function of receiving the posture data according to the second communication method, and
the master control device generates a three-dimensional model image simulating the operation mechanism having a posture corresponding to the posture data, based on the posture data and a main specification of the operation mechanism, and causes the image output device to display the point cloud image and the three-dimensional model image in a superimposed manner instead of the image of the operation mechanism of the work machine and the periphery of the operation mechanism on a condition that communication according to the first communication method is determined to be interrupted.

3. The display system for a work machine according to claim 2, further comprising:
   an operation sensor configured to acquire operation data representing operation of the work machine,
   wherein the master control device generates the three-dimensional model image of which a display mode differs according to a difference in operation state of the work machine which is represented by the operation data.

4. The display system for a work machine according to claim 1,
   wherein the master control device determines whether or not communication according to the first communication method is interrupted, and causes the image output device to display the point cloud image and a texture material in a superimposed manner instead of the image of the operation mechanism of the work machine and the periphery of the operation mechanism on a condition that the communication is determined to be interrupted.

5. The display system for a work machine according to claim 1,
   wherein the master control device matches a coordinate system of the point cloud image with a coordinate system of the captured image, which is acquired by the imaging device, according to an operator of coordinate transformation between the coordinate system of the captured image and a coordinate system of a distance image acquired by the distance sensor, which correspond to positions and postures of the imaging device and the distance sensor, respectively, to generate the point cloud image.

* * * * *